United States Patent [19]

Berghout et al.

[11] Patent Number: 4,910,638
[45] Date of Patent: Mar. 20, 1990

[54] CERAMIC MULTILAYER CAPACITOR

[75] Inventors: Cornelis W. Berghout; Hendrikus J. J. M. Van Haren, both of Eindhoven, Netherlands

[73] Assignee: U.S. Philips Corp., New York, N.Y.

[21] Appl. No.: 317,375

[22] Filed: Mar. 1, 1989

[30] Foreign Application Priority Data

Mar. 7, 1988 [NL] Netherlands ............... 8800559

[51] Int. Cl.⁴ .................... H01G 4/10; H01G 7/00
[52] U.S. Cl. ......................... 361/321; 29/25.42
[58] Field of Search ............... 361/308, 309, 310, 320, 361/321; 29/25.42

[56] References Cited

U.S. PATENT DOCUMENTS 4,459,166 7/1984 Dietz et al. ................. 361/411 X
4,604,676 8/1986 Senda et al. ................ 361/321 X

FOREIGN PATENT DOCUMENTS 0011389 5/1980 European Pat. Off. ........... 361/309
59-69907 4/1984 Japan .
151529 10/1981 U.S.S.R. ..................... 361/321

Primary Examiner—Donald A. Griffin
Attorney, Agent, or Firm—William L. Botjer

[57] ABSTRACT

In a multilayer capacitor, which is made of alternate layers 1 of a dielectric oxidic ceramic material and an electrode material 2, and which is provided with metallic end contacts 4 which electrically conductively contact a prescribed part of the layers of electrode material via an intermediate layer 3 of a conductive metal oxide, the metallic end contacts containing silver, the diffusion of silver from the end contacts to the layers of electrode material is suppressed effectively in that the intermediate layer is a heterogeneous layer which, apart from the conductive metal oxide, contains glass particles, and in that the heterogeneous layer has a thickness of at least 1 μm. On account of this, the end contacts can readily be manufactured from a paste, and delamination, cracking and the formation of cavities in the viscinity of the end contacts are suppressed.

13 Claims, 1 Drawing Sheet

CERAMIC MULTILAYER CAPACITOR

BACKGROUND OF THE INVENTION

The invention relates to a multilayer capacitor comprising alternate layers of a dielectric oxidic ceramic material and an electrode material, and having metallic end contacts which electrically conductively contact to a prescribed part of the layers of electrode material via an intermediate layer of a conductive metal oxide, the metallic end contacts containing silver.

The invention also relates to a method of manufacturing such a multilayer capacitor.

In U.S. Pat. No. 4,604,676 such a multilayer capacitor is described, in which the intermediate layer is a homogeneous thin layer having a thickness which must not exceed 2 $\mu$m, and according to the examples it does not exceed 0.35 $\mu$m. The intermediate layer is applied by means of a thin-film deposition method such as sputtering, vapour deposition or chemical deposition from the vapour phase. Subsequently, for example, layers of Ni-Cr, Ni and Ag are applied by means of vapour deposition and sputtering so as to obtain solderable end contacts.

The intermediate metal oxide layer is provided to avoid a reduction of the ceramic material. Said reduction may occur as a result of diffusion of oxygen from the ceramic material to the metallic end contacts at a raised temperature, and it causes the insulation resistance of the ceramic material to be substantially reduced.

In an alternative method of manufacturing metallic end contacts, a mixture of metal, such as silver and, for example, palladium or other noble metals, and glass in the form of a paste is used. The paste can readily be applied by immersing and it can be fired together with the internal electrode layers of the multilayer capacitor. The metallic end contacts thus obtained contain a quantity of glass particles. However, in this method a number of problems are encountered.

In the manufacture of multilayer capacitors, which are generally manufactured in large numbers, cracks are formed in a number of the products and delamination occurs in the ceramic material near the end contacts. If these cracks reach the active part of the capacitor they may induce increased leakage currents, silver migration under the influence of an electric field and short-circuits between the inner electrodes. Moreover, cavities are then formed near the end contact and the bonding of the end contact material to the ceramic material is insufficient.

In experiments leading to the present invention it has been found that silver diffusion from the end contacts to the inner electrodes takes place predominantly during firing. The inner electrodes are made in the usual manner of palladium which has a large affinity for silver. The volume and thickness of the inner electrodes increases locally which may lead to delamination and cracking. Outward migration of palladium caused by diffusion or increased pressure on the inner electrodes also takes place, albeit to a lesser extent. Owing to this, the material of the end contacts may become locally detached from the ceramic material and cavities may be formed. The formation of cavities may be counteracted by using a silver paste having a high glass-particle content, but then the problem arises that it is difficult to apply solderable layers onto such end contacts. Moreover, the silver diffusion continues.

SUMMARY OF THE INVENTION

It is an object of the invention to provide a ceramic multilayer capacitor and a method of manufacturing same, in which silver diffusion to the inner electrodes is effectively counteracted in order to reduce the number of rejects. A further object of the invention is to provide products which have no cracks and cavities in the vicinity of the end contacts and in which electrical faults are absent. An additional object of the invention is to provide a multilayer capacitor in which the end contacts can be manufactured, if desired, from a paste in a readily conceivable manner.

These objects are achieved according to the invention by a multilayer capacitor as described in the opening paragraph, which multilayer capacitor is characterized in that the intermediate layer is a heterogeneous layer which, apart from the conductive metal oxide, contains glass particles and has a thickness of at least 1 $\mu$m. In order to be very effective, the intermediate layer preferably has a thickness of at least 5 $\mu$m. In order to avoid that the equivalent series resistance of the multilayer capacitor becomes undesirably large, it is efficaceous for the intermediate layer to have a thickness of less than 20 $\mu$m, preferably less than 12 $\mu$m.

It is noted that in Japanese Patent Application No. 59-69907 a description is given of a multilayer capacitor in which the end contacts are made of two layers of an Ag-Pd paste having a different glass content. In this case silver diffusion from the end contact to the inner electrodes remains possible.

In a very suitable embodiment of the ceramic multilayer capacitor according to the invention, the glass particles consist of a glass composition comprising lead oxide. During firing the paste, a part of the lead oxide is reduced to a metallic lead having sufficient affinity for palladium to form an additional protective layer between the palladium inner electrodes and the silver-containing end contacts, and which metallic lead forms a very effective barrier against silver diffusion.

In a preferred embodiment of the ceramic multilayer capacitor according to the invention, the conductive metal oxide is selected from metal oxides which do not react with the glass, in particular at a raised temperature, such as during firing. In this respect, for example, tin oxide is less suitable.

Suitable conductive metal oxides which do not react with glass when the temperature is raised and which, hence, are suitable to be applied in the form of a paste, are, for example, ruthenium oxide $RuO_2$, lead ruthenate $Pb_2Ru_2O_7$, manganese dioxide $MnO_2$ and mixtures of ruthenium oxide and manganese dioxide having a manganese dioxide content up to 30% by weight. Experiments have shown that ruthenium oxide is very suitable.

In a particular embodiment of the ceramic multilayer capacitor according to the invention, the end contact comprises a layer of glass particles and a noble metal, preferably selected from silver and mixtures of silver and palladium.

In order to obtain a suitable solderability of the multilayer capacitor and suppress metal diffusion to the solder material, it is efficacious to cover the end contact with a common solder coating, for example a nickle layer followed by a layer of tin or lead-tin.

If desired, the inner electrodes, which contain palladium, may additionally contain other metals such as silver. It is also possible to introduce a small quantity of lead into the inner electrodes, for example in the form of metallic lead or lead oxide particles, which helps to suppress the silver diffusion to the inner electrodes.

The object of providing a method of manufacturing a multilayer capacitor which is made of alternate layers of a dielectric oxidic ceramic material and an electrode material, which capacitor is provided with metallic end contacts which electrically conductively contact a prescribed part of the layers of electrode material via an intermediate layer of a conductive metal oxide, the metallic end contacts containing silver, is achieved in that the method is characterized in that the intermediate layer is made of a paste which, besides the conductive metal oxide, comprises a temporary binder and glass particles.

Preferably, the glass particles are made of a glass composition comprising lead oxide.

The method according to the invention can particularly suitably be used for the manufacture of a multilayer capacitor in which the metallic end contacts are made of a paste comprising metal particles, glass particles and a temporary binder, the metal particles consisting of a noble metal selected from silver and mixtures of silver and palladium.

It is also possible to manufacture an end contact from a paste which comprises metal particles, for example silver particles, but no glass particles. In this way a very dense silver layer can be provided to which solderable layers can very suitably be applied by means of electro-deposition.

In a particularly effecacious embodiment of the method according to the invention, the only additional step in the method being an immersion step to provide the paste containing the conductive metal oxide, the temporary binder is removed by firing after both pastes have been provided.

However, in order to obtain a very effective barrier between the silver and the palladium, it is efficacious to fire each of the pastes at different times, that is, to fire the paste containing the conductive metal oxide before the silver-containing paste is provided, at a temperature which is at least 50° C. higher than the temperature at which the silver-containing paste is fired.

BRIEF DESCRIPTION OF THE DRAWINGS

The invention will be explained in more detail by means of examples and with reference to a drawing, in which FIG. 2 shows the variation of the quantities of silver and palladium in a multilayer capacitor according to the invention, measured along the line II—II in FIG. 1, and in which

EXAMPLE 1

A finely ground ceramic, dielectric powder, for example manufactured from $BaTiO_3$, is mixed with a binder, such as polyvinyl alcohol, a dispersing agent and water to form a slurry. The slurry is deposited in thin layers, for example having a thickness of 50 μm, which are dried to obtain foils and are subsequently provided with electrodes by means of screen printing using a metal paste, for example a palladium paste. These foils are stacked, for example in ten layers, compressed and divided into separate capacitor bodies, for example, having dimensions of $3 \times 1.5$ mm$^2$. The capacitor bodies are sintered at temperatures between 1200° and 1400° C., dependent upon the composition of the ceramic material, according to the present example at 1250° C. The ceramic material shrinks during sintering and densifies into a dense polycrystalline structure. The thickness of the ceramic layers amounts to approximately 25 μm. The powder particles of the metal paste are simultaneously sintered into electrode layers of metal which form a coherent unity with the dielectric layers.

A metal oxide paste is manufactured from 60% by weight of $RuO_2$ powder and 40% by weight of glass particles, ethyl cellulose being used as a binder and 2-ethoxy-ethylacetate as a solvent to obtain a suitable viscosity. The solids content of the paste amounts to 70 to 80%, the quantity of binder amounts to 2 to 3% by weight, and the rest is solvent. The composition of the glass particles, having dimensions from 1 to 2 μm, is for example: 37% by weight of PbO, 18% by weight of $B_2O_3$, 22% by weight of $SiO_2$, 11% by weight of ZnO, 3% by weight of $Al_2O_3$, 1.5% by weight of $Na_2O$ and 7.5% by weight of BaO.

Prior to the manufacture of the end contacts, the capacitor bodies are partly immersed in the metal oxide paste and fired at 850° C., layers having a thickness of approximately 15 μm being formed on both sides. The resistivity of the layers formed amounts to approximately 0.01 Ω cm.

Subsequently, end contacts are manufactured from a metal paste consisting of 95% by weight of silver particles and 5% by weight of glass particles, for example having the composition as described hereinbefore. The binder and the solvent used are also the same as in the metal oxide paste. The metal paste is fired at a temperature of 750° C. If desired, solderable layers of Ni and/or Sn/Pb can additionally be provided electrolytically or by means of electro-deposition or vacuum evaporation.

Figure 1:
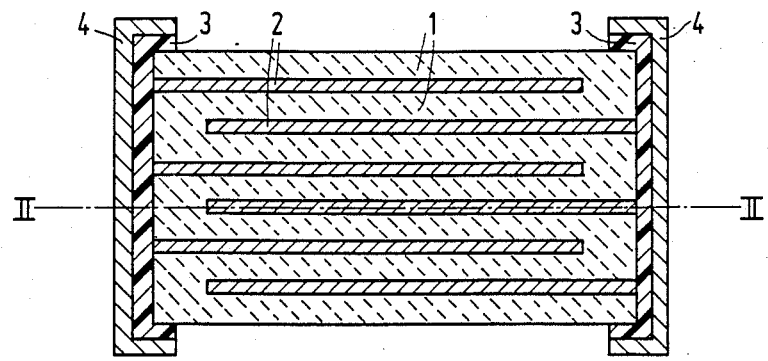
FIG. 1 is a cross-sectional view of a multilayer capacitor according to the invention.

FIG. 1 a is schematic cross-sectional view of a ceramic capacitor according to the invention, which comprises ceramic layers 1 and internal electrode layers or inner electrodes 2, and which is provided with metallic end contacts 4 having conductive intermediate layers 3.

Figure 2:
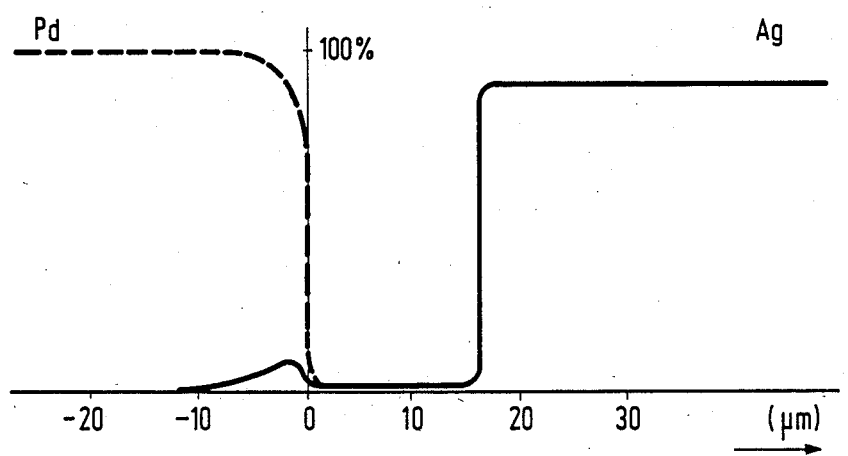

Along a part of the line II—II in FIG. 1, an analysis is made of the quantities of silver and palladium by means of an electron microscope provided with an EPMA device ("Electron Probe Micro-Analysis"). The result is shown in FIG. 2, in which the inner electrode is present on the left-hand side and the end contact is present on the right-hand side. In between there is the conductive metal oxide which forms an effective diffusion barrier against the silver. The horizontal scale represents distances along the line II—II measured in μm, the vertical scale represents relative qualities in % by weight.

Microscopic observations have shown that cracking and delamination do almost not occur anymore. The end contacts with the intermediate layers are firmly bonded to the capacitor body and the number of cavities in the vicinity of the end contacts is strongly reduced.

EXAMPLE 2

Ceramic multilayer capacitors are manufactured as indicated in example 1, the only difference being that $Pb_2Ru_2O_7$ is used instead of $RuO_2$. The intermediate layers 3 have a thickness of approximately 10 μm. The metal paste used for the manufacture of the end contacts contains 70% by weight of Ag particles and 30% by weight of Pd particles.

The pastes are not fired separately for the manufacture of the end contacts and the intermediate layers. After providing the metal oxide paste by means of immersing and a short drying step, the metal paste is provided after which both pastes are fired simultaneously at 750° C.

The result is satisfactory and better than in the case of ceramic multilayer-capacitors without intermediate layer, but it is not as good as the result obtained in example 1.

EXAMPLE 3, NOT ACCORDING TO THE INVENTION

Ceramic multilayer capacitors are manufactured as indicated in example 1, however, no intermediate layers of conductive metal oxide pastes are provided.

Figure 3:
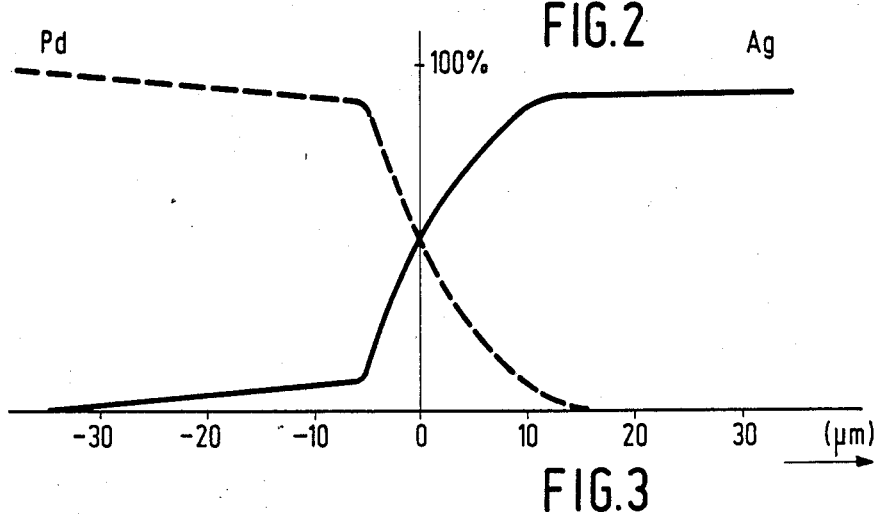
FIG. 3 represents the quantities of silver and palladium in a multilayer capacitor according to the present state of the art, measured along a corresponding line.

FIG. 3 shows an analysis of the quantities of silver and palladium, in which the inner electrode is present on the left-hand side and the end contact is present on the right-hand side. The drawing clearly shows that in this case silver diffusion has occurred to a large extent, and palladium diffusion has occurred to a smaller extent.

The invention provides ceramic multilayer capacitors and a method of manufacturing thereof, their quality being improved and the number of rejects being substantially reduced. Comparative experiments have shown that silver diffusion to the inner electrodes can be effectively suppressed as well as the negative consequences of such a diffusion.

What is claimed is

1. A multilayer capacitor comprising alternate layers of a dielectric oxidic ceramic material and an electrode material, and having metallic end contacts which electrically conductively contact a prescribed part of the layers of electrode material via an intermediate layer of a conductive metal oxide, the metallic end contacts containing silver, characterized in that the intermediate layer is a heterogeneous layer which, apart from the conductive metal oxide, contains glass particles and which has a thickness of at least 1 μm.

2. A multilayer capacitor as claimed in claim 1, characterized in that the glass particles consist of a glass composition comprising lead oxide.

3. A multilayer capacitor as claimed in claim 1 or 2, characterized in that the intermediate layer has a thickness of at least 5 μm.

4. A multilayer capacitor as claimed in claim 1, characterized in that the intermediate layer has a thickness of less than 20 μm, preferably less than 12 μm.

5. A multilayer capacitor as claimed in claim 1, characterized in that the conductive metal oxide is selected from metal oxides which do not react with the glass.

6. A multilayer capacitor as claimed in claim 5, characterized in that the conductive metal oxide is ruthenium oxide.

7. A multilayer capacitor as claimed in claim 1, characterized in that the end contact comprises a layer of glass particles and a noble metal, preferably selected from silver and mixtures of silver and palladium.

8. A multilayer capacitor as claimed in claim 7, characterized in that the end contact is covered with a common solder coating.

9. A method of manufacturing a multilayer capacitor from alternate layers of a dielectric oxidic ceramic material and an electrode material, which capacitor is provided with metallic end contacts which electrically conductively contact a prescribed part of the layers of electrode material via an intermediate layer of a conductive metal oxide, the metallic end contacts containing silver, characterized in that the intermediate layer is manufactured from a paste which, apart from the conductive metal oxide, comprises a temporary binder and glass particles.

10. A method as claimed in claim 9, characterized in that the glass particles are manufactured from a glass composition comprising a lead oxide.

11. A method as claimed in claim 9 or 10, characterized in that the metallic end contacts are manufactured from a paste which comprises metal particles, glass particles and a temporary binder, the metal particles consisting of a noble metal selected from silver and mixtures of silver and palladium.

12. A method as claimed in claim 11, characterized in that the temporary binder is removed by firing after both pastes have been applied.

13. A method as claimed in claim 11, characterized in that before the silver-containing paste is provided, the paste with the conductive metal oxide is fired at a temperature which is at least 50° C. higher than the temperature at which the silver-containing paste is fired.

* * * * *